(12) United States Patent
Wolf et al.

(10) Patent No.: US 10,178,167 B2
(45) Date of Patent: Jan. 8, 2019

(54) REAL-TIME PEER-TO-PEER COMMUNICATIONS IN AN ENVIRONMENT THAT INCLUDES A RESTRICTED CHANNEL

(71) Applicant: Apple Inc., Cupertino, CA (US)

(72) Inventors: Andreas Wolf, San Carlos, CA (US); Tashbeeb Haque, San Francisco, CA (US); Saravanan Balasubramaniyan, Los Gatos, CA (US); Veerendra M. Boodannavar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 581 days.

(21) Appl. No.: 14/292,682

(22) Filed: May 30, 2014

(65) Prior Publication Data
US 2015/0351114 A1 Dec. 3, 2015

(51) Int. Cl.
*H04W 28/02* (2009.01)
*H04L 29/08* (2006.01)
(Continued)

(52) U.S. Cl.
CPC ........ *H04L 67/1085* (2013.01); *H04L 67/104* (2013.01); *H04L 67/1068* (2013.01);
(Continued)

(58) Field of Classification Search
CPC ......... H04L 29/08306; H04L 29/08396; H04L 29/08531; H04L 67/104; H04N 21/63; H04W 4/005; H04W 28/0215
See application file for complete search history.

(56) References Cited

U.S. PATENT DOCUMENTS 8,335,937 B2 12/2012 Qi et al.
2002/0188723 A1 12/2002 Choi et al.
(Continued)

FOREIGN PATENT DOCUMENTS

CN 101563891 A 10/2009
JP 2009-302874 A 12/2009
(Continued)

OTHER PUBLICATIONS

"Understanding Dynamic Frequency Selection", Cisco, OL-11491-03, 2008, pp. 1-6.*
(Continued)

*Primary Examiner* — Salvador E Rivas
(74) *Attorney, Agent, or Firm* — Sterne, Kessler, Goldstein & Fox, PLLC (57) ABSTRACT

An apparatus and methods are provided for conducting wireless data communications, particularly real-time data communications, in a communication environment that includes a restricted channel (e.g., a channel subject to Dynamic Frequency Selection or DFS). Two or more mobile communication/computing devices (e.g., smart phones, tablet computers) participate in a peer-to-peer network and engage in data communications while one or more of them operate on the restricted channel (e.g., to maintain an infrastructure communication connection). Their channel sequences are configured to maximize the efficiency of the data communication while satisfying restrictions of the restricted channel or avoiding that channel, and only require them to monitor one beacon interval. One or more of the devices may strategically roam to the restricted channel or away from the restricted channel, depending on which action will provide greater communication throughput or efficiency.

19 Claims, 3 Drawing Sheets

(51) Int. Cl.
  *H04W 76/14* (2018.01)
  *H04W 36/00* (2009.01)
  *H04W 92/18* (2009.01)
(52) U.S. Cl.
  CPC ..... *H04L 67/1074* (2013.01); *H04W 28/0215* (2013.01); *H04W 36/00* (2013.01); *H04W 76/14* (2018.02); *H04W 92/18* (2013.01)

(56) References Cited

U.S. PATENT DOCUMENTS

| | | |
|---|---|---|
| 2003/0002456 A1 | 1/2003 | Soomro et al. |
| 2006/0252418 A1 | 11/2006 | Quinn et al. |
| 2007/0149230 A1* | 6/2007 | Song ............... H04W 72/02 455/515 |
| 2008/0107156 A1 | 5/2008 | Wentink et al. |
| 2009/0310583 A1 | 12/2009 | Suzuki |
| 2010/0039973 A1 | 2/2010 | Cavalcanti et al. |
| 2010/0135256 A1 | 6/2010 | Lee et al. |
| 2011/0161697 A1 | 6/2011 | Qi et al. |
| 2011/0211219 A1* | 9/2011 | Bradley ............. H04W 48/16 358/1.15 |
| 2011/0305228 A1 | 12/2011 | Cordeiro |
| 2013/0039298 A1* | 2/2013 | Park ................. H04W 16/14 370/329 |
| 2013/0132500 A1 | 5/2013 | Vandwalle et al. |
| 2013/0132501 A1 | 5/2013 | Vandwalle et al. |
| 2013/0132502 A1 | 5/2013 | Stacey et al. |
| 2013/0185373 A1 | 7/2013 | Vandwalle et al. |
| 2013/0195036 A1 | 8/2013 | Quail et al. |
| 2013/0272277 A1* | 10/2013 | Suwa ............... H04W 56/0015 370/336 |
| 2013/0343198 A1 | 12/2013 | Chhabra et al. |
| 2014/0003414 A1 | 1/2014 | Choudhury et al. |
| 2014/0362726 A1 | 12/2014 | Vandwalle et al. |
| 2015/0351114 A1 | 12/2015 | Wolf et al. |

FOREIGN PATENT DOCUMENTS

| | | |
|---|---|---|
| JP | 2013-509140 A | 3/2013 |
| JP | 2014-522196 A | 8/2014 |
| JP | 2015-503885 A | 2/2015 |
| WO | WO 2011/078948 A2 | 6/2011 |
| WO | WO 2013/022293 A2 | 2/2013 |
| WO | WO 2013/106711 A1 | 7/2013 |

OTHER PUBLICATIONS

"Understanding Dynamic Frequency Selection", Cisco, OL-11491-03, 2008, pp. 1-6 (Year: 2008).*

"802.11-2016—IEEE Standard for information technology—Telecommunications and information exchange between systems—Local and metropolitan area networks—Specific requirements—Part 11: Wireless LAN Medium Access Control (MAC) and Physical Layer (PHY) Specifications," Dec. 14, 2016, The Institute of Electrical and Electronics Engineers, New York, NY (US), pp. 1-1923.

"802.11-2016—IEEE Standard for information technology—Telecommunications and information exchange between systems—Local and metropolitan area networks—Specific requirements—Part 11: Wireless LAN Medium Access Control (MAC) and Physical Layer (PRY) Specifications," Dec. 14, 2016, The Institute of Electrical and Electronics Engineers, New York, NY (US), pp. 1924-3534.

* cited by examiner

REAL-TIME PEER-TO-PEER COMMUNICATIONS IN AN ENVIRONMENT THAT INCLUDES A RESTRICTED CHANNEL

BACKGROUND

This disclosure relates to the field of computer systems. More particularly, an apparatus and methods are provided for conducting wireless real-time peer-to-peer (P2P) communications while satisfying the requirements of a restricted channel or adjusting the P2P communications to avoid a restricted channel.

Wireless communication protocols and technologies provide flexibility by enabling use of different wireless communication channels for different operations. For example, a mobile communication device or computing device may maintain a connection with an infrastructure access point or other central node on one channel for the purpose of participating in a Wi-Fi network. To engage in an operation that is not part of the Wi-Fi network, the device may tune its radio to a different channel—to participate in peer-to-peer communications or to maintain a Bluetooth® connection, for example.

However, common wireless channels are increasingly congested as more and more wireless devices are deployed. Further, some wireless channels that are relatively uncongested are restricted in one way or another. For example, use of some channels requires devices to implement Dynamic Frequency Selection (DFS) to avoid interfering with a protected signal (e.g., RADAR). In order to comply with regulations associated with restricted channels, some P2P wireless communication schemes completely avoid operating on restricted channels.

SUMMARY

In some embodiments, an apparatus and methods are provided for conducting wireless peer-to-peer real-time data communications on a restricted channel or around a restricted channel. In these embodiments, appropriate measures are implemented to prevent the communications from violating restrictions placed on the restricted channel, while promoting efficient wireless communications. For example, depending on how long a device's radio is tuned away from a restricted channel, it may or may not immediately resume communicating on the restricted channel when it returns to that channel.

In some embodiments, when one device engaged in the data communications is tied to a restricted channel, the other device may roam to the restricted channel so that they can dedicate more time to the data exchange. In general, each device participating in a P2P network will attempt to minimize the amount of time that it is unable to communicate with another peer by, for example, timing its channel switches to place them on the same channel at the same time and, if that channel is restricted, ensuring that they may communicate without violating any restriction.

In some embodiments, one or more devices engaged in data communications may strategically roam away from a restricted channel, even to an alternative channel that features a poorer or weaker infrastructure (e.g., Wi-Fi) connection, as measured by RSSI for example. A channel selected for operating wireless communications in real-time or non-real-time may be selected based on any or all of several factors, such as the loads/congestion of available channels (e.g., BSS load, channel load), whether a given channel is restricted, whether a given channel offers an infrastructure connection, what type of traffic exists on a channel, and/or others.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, this disclosure is not intended to be limited to the embodiments shown, but rather is to be accorded the widest scope consistent with the disclosure.

In some embodiments, an apparatus and methods are provided for efficiently conducting wireless peer-to-peer (P2P) data communications between two or more communication/computing devices (e.g., smart phones, tablet computers), particularly communications involving real-time data. In these embodiments, one or more of the devices is tied to or associated with a restricted channel (e.g., because of a communication connection with an infrastructure network that operates on the channel), at least initially, wherein limitations regarding use of the restricted channel might normally inhibit efficient P2P communication among the devices on that channel. However, methods described below allow the devices to mitigate or eliminate the impact of those limitations.

In these embodiments, a restricted channel is a channel that requires deference to a preferred or protected signal source or type of signal, and that may require devices to quiesce or exit the channel in certain circumstances. An exemplary restricted channel is one that requires the use of DFS (Dynamic Frequency Selection) or a similar scheme to avoid interfering with a RADAR signal or other type of protected signal.

Among other obligations, DFS requires devices tuned to the corresponding channel to exit the channel if they receive a Channel Switch Announcement (CSA). And, because CSAs are conveyed within regularly transmitted beacons, devices must quiesce if they do not receive a beacon from a DFS master or other authoritative source (e.g., an access point) within some number of (i.e., two) beacon intervals. Satisfying DFS requirements typically decreases the throughput and efficiency of devices' communications, at least when tuned to the restricted channel.

In some embodiments, therefore, devices engaged in P2P communications "strategically" roam to and/or away from a restricted communication channel, possibly to a channel that provides a poorer connection than the restricted channel—as measured by RSSI (Received Signal Strength Indicator), for example. In some scenarios, for example, one device engaged in real-time data communications with another device that is affiliated with or tied to a restricted channel (e.g., because of an infrastructure communication connection) may strategically roam to the restricted channel.

In other scenarios, two or more communicating devices may strategically roam away from a restricted channel to the same channel or to different channels, and arrange channel sequences that reduce or eliminate any need to tune to the restricted channel. As used herein, "strategic" roaming is different than the automatic roaming that devices implement when they transit from one access point (AP) or other central node to another, due to decreasing or decreased signal strength of the first AP and a stronger signal offered by the second.

For example, an impetus for automatic roaming is to improve the efficiency of communications between a given device (e.g., a mobile communications device or computing device) and a central node (e.g., an access point), and may cause the device to affiliate with an access point having a stronger signal than another access point, or having any signal at all if the other access point's signal is fading or gone. Automatic roaming may be necessary in order to avoid losing network connectivity, such as when a device moves in space while an operator is walking or driving.

In contrast, a goal of strategic roaming is to improve the efficiency of communications between two (or more) peer devices, even if the roaming causes decreased communication efficiency between a device and an access point. Thus, strategic roaming may involve roaming when an automatic roaming scheme would not roam, and possibly not roaming (e.g., to a restricted channel) when automatic roaming would.

In some embodiments, communicating devices may continue to visit a restricted channel, but may arrange their channel-hopping sequences to allow them to immediately resume their communications when they return to the restricted channel. For example, if they return to a DFS channel less than two beacon periods since they last captured a beacon on that channel, they may resume their communications immediately, without first waiting for a beacon. Thus, they may conduct their data communications primarily on the restricted channel (instead of avoiding it), but will tune to other channels as necessary to satisfy other communication requirements (e.g., to participate in a P2P network).

In embodiments described herein, the communicating devices need only track beacon periods or Target Beacon Transmission Times (TBTTs) of one access point or central node, even as they switch among multiple channels. Illustratively, this one AP may be a DFS master of a DFS channel or the AP of a home channel on which one or more of the devices maintain an infrastructure (e.g., Wi-Fi) connection.

Figure 1:
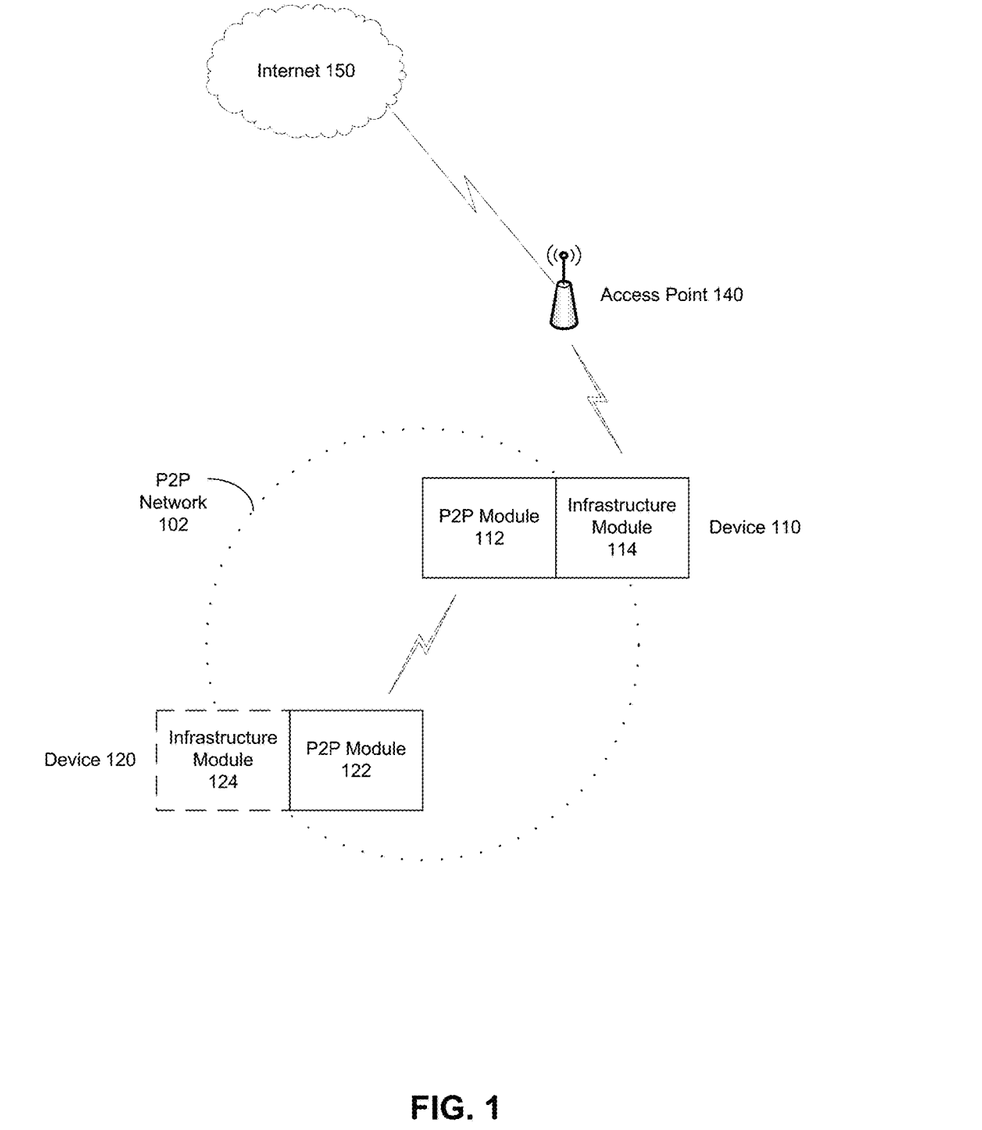
FIG. 1 is a block diagram depicting a communication environment for conducting wireless peer-to-peer communications, in accordance with some embodiments.

FIG. 1 is a diagram of a communication environment in which one or more embodiments may be implemented. In these embodiments, devices 110, 120 are conducting or will conduct real-time peer-to-peer (P2P) communications, and both of them participate in P2P network 102. In some implementations, P2P network 102 is a Neighbor Awareness Networking (NAN) network. Other devices may participate in the P2P network and/or communicate with devices 110, 120, but these other devices are omitted from FIG. 1 for the sake of clarity.

Device 110 comprises P2P communication module 112, which includes software and/or firmware executed by a processor to implement the operative P2P communication protocol. Device 110 also comprises infrastructure communication module 114, which includes software and/or firmware executed by a processor to implement an infrastructure (e.g., Wi-Fi) communication protocol and participate in an infrastructure network. Modules 112, 114 may share one or more communication components of device 110 (e.g., antenna, battery).

The infrastructure network includes access point (AP) 140, which is coupled to a network such as the Internet 150. Therefore, device 110 is associated with and maintains a connection with AP 140, which requires the device to operate at least periodically on a communication channel used by the access point to broadcast beacons. Device 110 may therefore be considered to be affiliated with or tied to the communication channel.

Device 120 is similar to device 110 in that it includes P2P module 122 and may participate in P2P network 102. Device 120 may optionally include infrastructure module 124 and may therefore be affiliated or associated with access point 140 or some other central node that hosts or supports an infrastructure network.

P2P network 102 may include any number of devices in addition to devices 110, 120, which may be arranged in a hierarchical cluster under an anchor master and possibly one or more additional masters. Either or both of devices 110, 120 may be masters within the P2P network, and one of them may be the anchor master. Participation in P2P network 102 requires devices 110, 120 to periodically visit one or more social channels on which discovery beacons are broadcast (by masters) to advertise the existence of the network, and on which discovery windows are conducted that enable the network members to discover each other and their services.

In the illustrated embodiments, the operating channel of access point 140, on which device 110 receives the AP's beacons, is a restricted channel that requires implementation of DFS. Further, devices 110, 120 have initiated or are initiating a transfer of data that is relatively extended in duration and/or that includes real-time data, as part of an application, service, or utility such as AirPlay®, AirDrop®, or Apple TV® by Apple® Corporation.

In these embodiments, the devices may engage in strategic roaming, may configure their channel sequences to prioritize the data transfer, may change their operating or home channels, and/or take other action to support the data transfer while satisfying or eliminating competing communication requirements (e.g., of the restricted channel, of P2P network 102).

Illustratively, a device may roam in response to detection of congestion on a channel, awareness of a relatively low level of communication throughput because of competing requirements placed on the device's radio, a determination that roaming to the home or operating channel of a communication partner would better support the data communications, or for some other reason. A device may roam to any suitable channel, or may be programmed or instructed to roam to a specific channel (e.g., a channel identified by a peer device).

In some embodiments, a device receives hints regarding whether it should roam and/or change its channel sequence. For example, an application operated or executed by the device may indicate that a particular channel has or will have less (or more) traffic than expected or than previously encountered, in which case the device may adjust its channel sequence to spend less (or more) time on that channel. Thus, when a media-streaming application that depends on timely delivery of data is executed (e.g., Apple TV®, iTunes®, YouTube™), the application may indicate that the current media is available via some other (faster) path or connection (e.g., a wired link, a channel used for an infrastructure connection), in which case the device's wireless channel sequence can be adjusted to de-prioritize a channel that had been allocated to the application but that now will convey less information.

In some other embodiments, an access point or other authoritative network node identifies channels that are currently being used by neighboring access points or nodes. Devices that need to exchange a significant amount of data may choose to avoid the identified channels when selecting a channel or channels on which to conduct their data transfer.

In some particular implementations, to identify channels that are less occupied when selecting a channel on which to operate, a device may issue to an access point a request for a neighbor report, as provided for in IEEE 802.11k, on either or both the 2.4 GHz and 5 GHz bands. The neighbor list(s) it receives will allow the device to identify channels on which nearby access points operate, and the device may avoid selecting one of those channels for its data exchange operations. Illustratively, a device may pick another channel (e.g., an unrestricted 5 GHz channel) without first assessing it, or may assess one or more channels other than the identified channels, and pick one that is less congested. Because two communicating peers (e.g., devices 110, 120 of FIG. 1) may receive different neighbor lists (based on their locations), they may cooperate to select a channel (or channels) that are omitted from both lists, if possible.

In some embodiments, information that may be obtained and used for the purpose of selecting a channel to roam to may include BSS (Basic Service Set) load, channel load, which types of communication traffic and protocols are detected on which channels, and/or other indications of how congested or uncongested a channel is, and what type(s) of communications may already exist on it.

Figure 2:
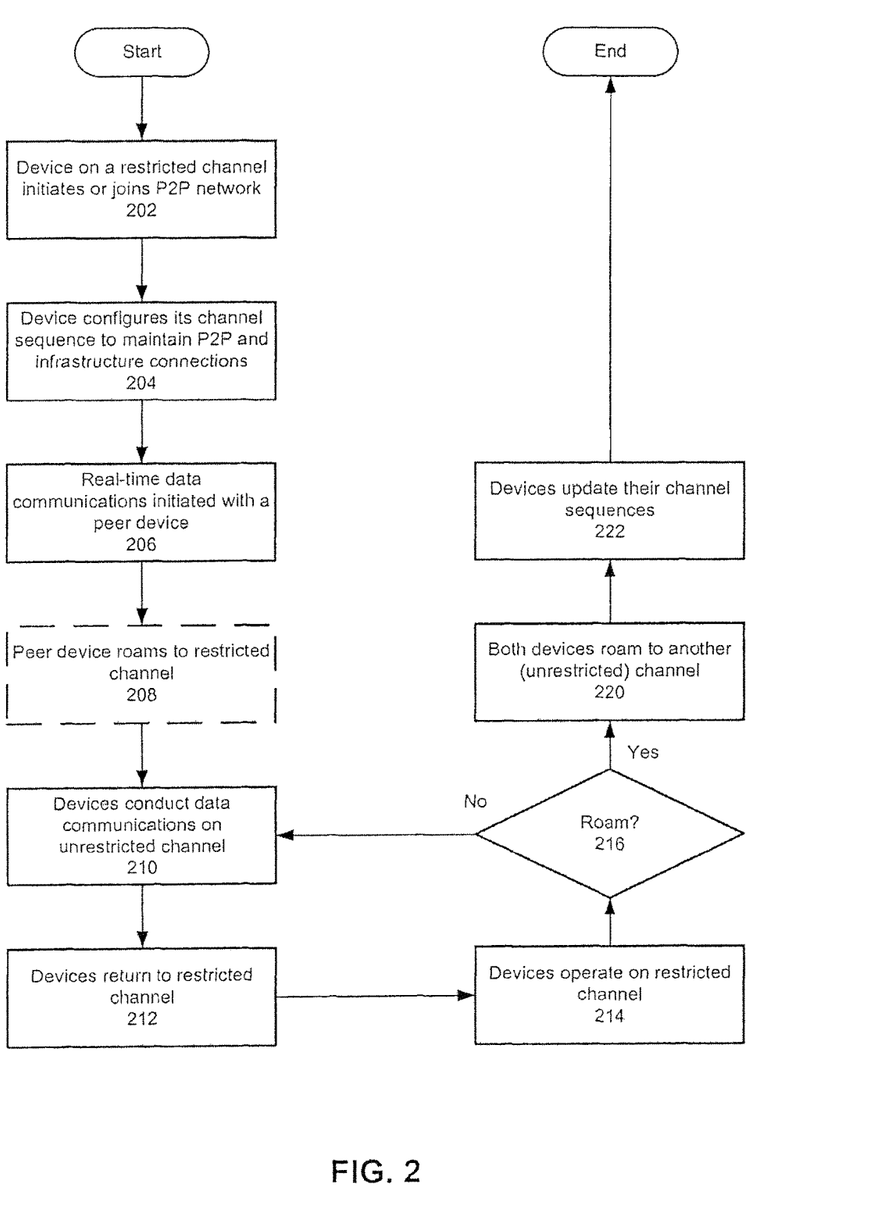
FIG. 2 is a flow chart illustrating a method of conducting peer-to-peer data communications in an environment that features a restricted channel, in accordance with some embodiments.

FIG. 2 is a flow chart demonstrating a method of conducting real-time peer-to-peer (P2P) data communications, according to some embodiments. In some implementations, the data communications may be conducted partly (or primarily) on a restricted channel. Conversely, in some other implementations the data communications may avoid a restricted channel.

In other methods, one or more of the operations depicted in FIG. 2 may be omitted, repeated, and/or performed in a different order. Accordingly, the specific arrangement of operations shown in FIG. 2 should not be construed as limiting the scope of the embodiments described herein. In general, and as discussed below, devices engaged in real-time P2P communications will endeavor to gather on the same channel and, if that channel is restricted, will also endeavor to spend as much time as possible in states or conditions that allow them to continue to communicate without violating any restriction.

Prior to activation of the illustrated method, a communication/computing device such as device 110 of FIG. 1 has an infrastructure affiliation with a restricted channel. For example, the device may have established a Wi-Fi connection with an access point that is operating as a DFS master. Therefore, while the device is tied to the restricted channel in order to maintain an infrastructure connection, use of the channel is subject to DFS restrictions.

In operation 202, the device creates or joins a P2P network. Although it may be implemented for a Neighbor Awareness Networking (NAN) P2P network, the illustrated method is readily modifiable to suit some other type of P2P network (e.g., Wi-Fi Direct). If the device creates the P2P network, it will serve (at least initially) as the anchor master, and will therefore set operating parameters that may determine things such as the social channel(s) on which the network operates, the periodicity of discovery beacons (for advertising the network to other devices), periodicity and duration of discovery windows (for identifying member devices and their services), and/or others. If the P2P network already exists, the device joins subject to the current operating parameters, and may or may not become a master. If it assumes a master role, it will be responsible for broadcasting discovery beacons and attending discovery windows according to the established schedule.

Illustratively, the operating channels of the P2P network may include a channel in the 2.4 GHz band (e.g., channel 1, channel 6) as well as one in the 5 GHz channel (e.g., channel 36, channel 56, channel 149), which may or may not be the restricted channel that hosts the device's connection with the access point.

In operation 204, after creating or joining the P2P network, the device configures its channel sequence, which will be used to determine when to switch from one channel to another and which may be regularly updated. In addition to any other requirements levied on the device's radio (e.g., to use Bluetooth) the device's channel sequence is arranged to allow it to maintain its infrastructure connection and, for the P2P network, to broadcast discovery beacons on one or more social channels (if it is a master device in the P2P network) and attend one or more discovery windows within every sequence of discovery windows conducted by the P2P network.

In operation 206, the device initiates real-time data communications with another member of the P2P network (i.e., a peer device). In one illustrative scenario, the device discovers the peer device during a discovery window, contacts the peer during that window, and establishes a connection to exchange data as part of an application or service provided by the peer device. For example, the peer device may be a digital media extender or media streaming device, such as Apple TV®, or may be a peer with which the device wishes to exchange a large set of data or play a game.

In operation 208, the peer device strategically roams to the restricted channel, assuming it did not already have an infrastructure connection on that channel. Illustratively, the device informs the peer device of the device's "home" channel—the channel on which it has an infrastructure connection—and the peer device breaks its infrastructure connection on another channel (if it had one) and affiliates with an access point on the restricted channel.

If the peer device did not have an infrastructure connection, that aspect of this operation is omitted. Instead, the peer device may simply follow the device's channel sequence to the extent possible, and monitor beacons issued by the access point with which the device is affiliated.

Also in operation 208, both devices configure or reconfigure their channel sequences to allow them to conduct their data communications while satisfying any other requirements they may have. In some implementations of the illustrated method, the devices may primarily use a channel other than the restricted channel for their data communication (e.g., a channel used by the P2P network), but return to the restricted channel periodically to maintain an infrastructure connection. Conversely, in other implementations they may primarily conduct their data communications on the restricted channel, but tune to others as necessary (e.g., for P2P network operations).

In operation 210, the devices tune to one or more channels other than the restricted channel and begin or resume their real-time data communications. During this time the devices may also (independently or together) conduct P2P operations and/or satisfy other communication requirements.

In operation 212, both devices return to the restricted channel in order for one or both of them to maintain infrastructure connections.

In operation 214, the devices operate on the restricted channel. If they were absent from the restricted channel for less than two beacon intervals of the access point (or other specified time threshold), they may begin operating (e.g., resuming their data communications) as soon as they switch to the restricted channel, but must quiesce if and when two such intervals pass without receipt of a beacon. Otherwise, they may be required to remain silent until they receive a beacon, which will indicate whether they are free to communicate on the channel. Operation on the restricted channel may involve receiving a beacon, responding to a beacon, scanning the channel, resuming their data communications, and/or other activity.

In operation 216, one or both devices determine whether it or they should roam to a different channel. Advantageously, roaming to an unrestricted channel will eliminate any need to adhere to the restrictions inherent in operating on the restricted channel (e.g., the risk of having to exit the channel), and may allow them to dedicate more time to their data communications, thereby increasing the efficiency of the exchange. A device may determine that it should roam if it determines that its throughput or efficiency in conducting the data communications is below a threshold, if one or more CSA (Channel Switch Announcements) are received on the restricted channel, if its infrastructure connection is no longer needed, or for some other reason.

For example, the devices may be unable to efficiently conduct their data communications on the restricted channel if a CSA is received, if the channel is saturated with other traffic of the access point or other devices, and/or for other reasons. Contrarily, if the restricted channel is relatively uncongested, the devices may be able to efficiently conduct their communications on the channel and, by only switching away from it to meet requirements of the P2P network, they may never be absent from it for more than two beacon intervals, in which case they may always immediately resume their communications when they return to the channel.

In other methods, a device's decision whether to strategically roam away from a restricted channel may be made at a different time. For example, a device may continually monitor relevant conditions and factors, and initiate roaming at any appropriate time during its data communications.

If the devices choose not to roam, or if roaming is not available or is not an option (e.g., no other access points are operating within range), the devices switch away from the restricted channel at an appropriate time (e.g., after receiving a beacon, after responding to a beacon, to attend a discovery window) and return to operation 210 to resume their data communications on one or more unrestricted channels, and to attend to any other communication requirements.

Otherwise, in operation 220, the devices roam to another channel, preferably (but not always) an uncongested and unrestricted channel. Selection of an appropriate channel to which to roam is done strategically in order to improve the efficiency of the devices' real-time data communications, and hence may target an access point whose signal is weaker than that of the restricted channel's AP.

In different implementations or scenarios, the two devices may roam independently and affiliate with the same or different access points on the same or different channels (if both of them require infrastructure connections). In some other implementations or scenarios, one device may roam to find a suitable channel and then advise the other by returning to the restricted channel, by notifying the other device during a P2P operation such as a discovery window, via an out-of-band communication, or in some other manner.

In operation 222, the devices update their channel sequences to enable them to conduct the real-time data communications while participating in the P2P network and satisfying their infrastructure requirements, if any. Because the devices may now be free of any requirements to visit a restricted channel, and free of the restrictions of such a channel, they can hopefully dedicate more time to the data communications. If they have roamed to a channel used by the P2P network, they may be able to conduct the data communications virtually full-time, other than when they participate in a discovery window or broadcast a beacon (if either of them is a master).

Embodiments of the method described above allow two or more peer devices to prioritize (real-time) data communications, and may cause them to strategically roam to another channel when they otherwise would not. Similarly, they may strategically avoid automatically roaming to a "better" channel (e.g., a channel hosted by an access point having a stronger signal) if that channel is a restricted channel or would (or may) otherwise negatively impact their data communications (e.g., because of channel congestion).

Thus, strategic roaming in multiple situations may increase the efficiency of the peer devices' data communications. In one situation, one device has a legacy (e.g., Wi-Fi) communication connection on a restricted channel, while its communication partner has a connection on some other channel. In this situation, the partner roams to the restricted channel, thus causing both devices to have the same "home" channel and facilitating the process of receiving beacons on the channel (and listening for CSAs). Further, they can conduct their data communications full time on the restricted channel in the absence of a CSA and as long as any switches away from the restricted channel are of short duration (e.g., less than two beacon intervals). This situation improves the communication efficiency at least to the extent that the communication partner no longer needs to visit the channel on which it previously maintained an infrastructure connection (at least not for the purpose of maintaining that connection).

In a second situation, either or both devices are affiliated with the restricted channel, but their communications are relatively inefficient either because they must exit the channel (because of a CSA) or because they periodically or regularly switch away from the restricted channel for a relatively long period of time (e.g., more than two beacon intervals), thereby requiring them to quiesce when they return, at least until a beacon is received (or until a scheduled beacon is not heard). Therefore, they roam to another channel, preferably an unrestricted 5 GHz channel, although that is not required. This situation may allow them to conduct their data communications virtually full time on the new channel and while participating in their P2P network. This situation improves the communication efficiency at least to the extent that the communications no longer suffer due to the limitations and requirements of the restricted channel.

Advantageously, the methods described above do not require a device to monitor more than one beacon interval—that of the restricted channel's access point, or whichever access point the device affiliates with.

In some embodiments, a peer device compatible with embodiments described above includes an application processor to support execution of applications (e.g., applications that involve communication of data that may be real-time in nature). The application processor provides memory management, graphics processing, and/or other functions needed by the applications. The peer device in some embodiments also includes a wireless interface for performing wireless communications, such as a baseband processor, along with corresponding memory and a transceiver for supporting the wireless communications and communications processing.

Thus, in some embodiments, a "communication module" or "wireless communication module" of a peer device may refer to a robust wireless interface component described immediately above. In some other embodiments, a communication module may encompass a baseband processor and a corresponding wireless transceiver for operating or managing an antenna of the device, and possibly memory used by the baseband processor. In yet other embodiments, a communication module may encompass other components necessary to transmit and receive data to and from the peer device.

Figure 3:
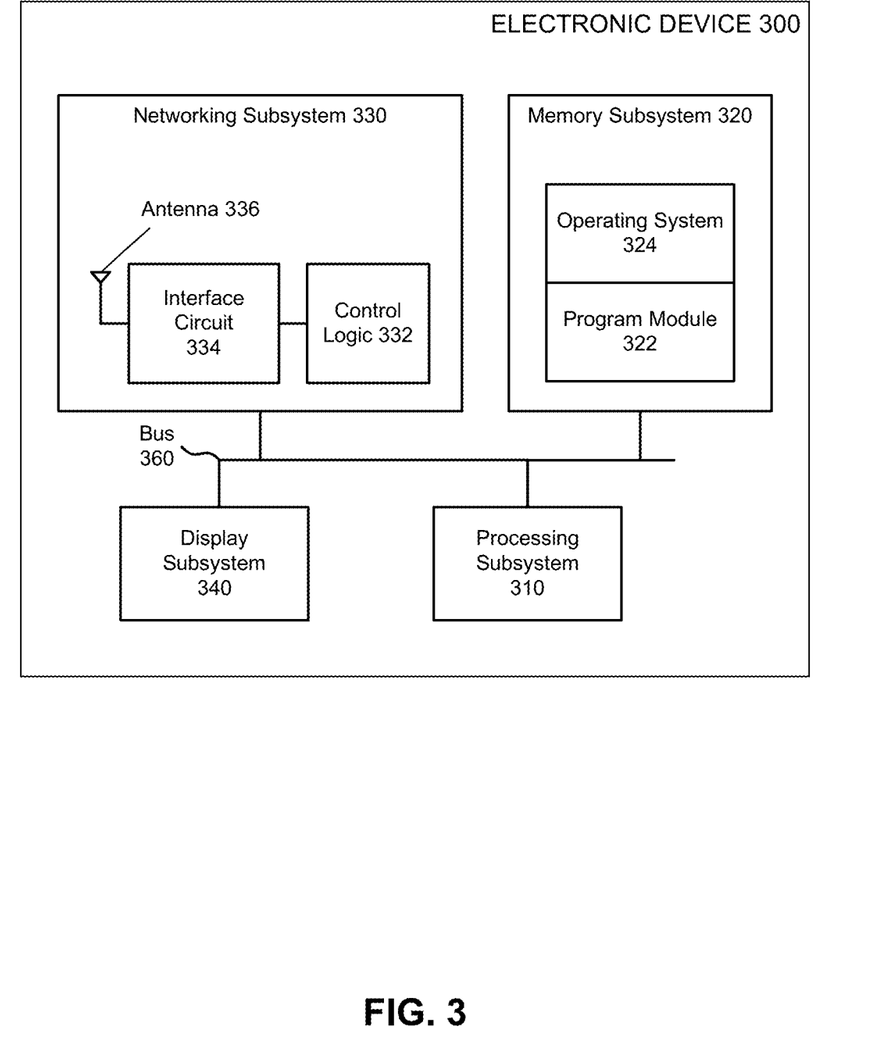
FIG. 3 is a block diagram of an electronic device, in accordance with some embodiments.

FIG. 3 is a block diagram illustrating an electronic device according to some embodiments. Electronic device 300 may, for example, reflect one or both of electronic devices 110 and 120 of FIG. 1. Device 300 includes processing subsystem 310, memory subsystem 320, networking subsystem 330, and display subsystem 340.

Processing subsystem 310 includes at least one component configured to perform computational operations. For example, processing subsystem 310 can include one or more microprocessors, application-specific integrated circuits (ASICs), microcontrollers, programmable logic devices, and/or digital signal processors (DSPs).

Memory subsystem 320 includes one or more components for storing data and/or instructions for processing subsystem 310 and/or networking subsystem 330. In particular, memory subsystem 320 may include dynamic random access memory (DRAM), static random access memory (SRAM), and/or other types of non-transitory memory. In some embodiments, instructions that are stored in memory subsystem 320 include program modules and/or sets of instructions that can be executed by processing subsystem 310 (e.g., program module 322, operating system 324).

A program module or set of instructions may constitute a computer-program mechanism. Instructions in the components of memory subsystem 320 may be implemented in a high-level procedural language, an object oriented programming language, and/or an assembly or machine language. Any of these languages may be compiled or interpreted for execution by processing subsystem 310, and therefore may be termed 'configurable' or 'configured' (which terms may be used interchangeably in this discussion).

In addition, memory subsystem 320 can include components for controlling access to memory. In some embodiments, memory subsystem 320 includes a memory hierarchy that comprises one or more caches coupled to a memory. In some of these embodiments, one or more of the caches are located in processing subsystem 310.

In some embodiments, memory subsystem 320 is coupled to one or more high-capacity mass-storage devices (not shown). For example, memory subsystem 320 can be coupled to a magnetic drive, an optical drive, a solid-state drive, or some other type of mass-storage device. In these embodiments, memory subsystem 320 can be used by electronic device 300 as fast-access storage for often-used data, while the mass-storage device is used to store less frequently used data.

Networking subsystem 330 includes one or more components configured to couple to and communicate on a wired and/or wireless network (i.e., to perform network operations), including control logic 332, interface circuit 334, and antenna 336. In some implementations, networking subsystem 330 includes a Bluetooth® networking system, a cellular networking system (e.g., a 3G/4G network such as UMTS, LTE, etc.), a universal serial bus (USB) networking system, a networking system based on a standard described in IEEE 802.11 (e.g., a Wi-Fi networking system), an Ethernet networking system, and/or some other networking system.

Networking subsystem 330 includes processors, controllers, radios/antennas, sockets/plugs, and/or other components used for coupling to, communicating on, and handling data and events for each supported networking system (not all of these components are depicted in FIG. 3). Note that mechanisms used for coupling to, communicating on, and handling data and events on a network are sometimes collectively referred to as a 'network interface' for a corresponding network system. Moreover, in some embodiments a 'network' between electronic device 300 and some other device does not yet exist. Therefore, electronic device 300 may use the components of networking subsystem 330 to perform simple wireless communication between the electronic devices, such as transmitting (or receiving) advertising or beacon frames, to facilitate establishment of a network.

Electronic device 300 also includes display subsystem 340 for displaying information on a display component, which may include a display driver and the display, such as a liquid-crystal display, a touchscreen (e.g., a multi-touch touchscreen), etc.

Within electronic device 300, processing subsystem 310, memory subsystem 320, networking subsystem 330, and display subsystem 340 are coupled together using bus 360. Bus 360 may include an electrical, optical, and/or electro-optical connection that the subsystems can use to communicate commands and data among one another. Although only one bus 360 is shown for clarity, different embodiments may include a different number or configuration of busses.

Electronic device 300 can be (or can be included in) any electronic device having at least one network interface. For example, electronic device 300 can be (or can be included in) a desktop computer, a laptop computer, a server, a media player (such as an MP3 player), an appliance, a subnotebook/netbook, a tablet computer, a smartphone, a cellular telephone, test equipment, a network appliance, a set-top box, a personal digital assistant (PDA), a toy, a controller, a digital signal processor, a game console, a computational engine within an appliance, a consumer-electronic device, a portable computing device, a personal organizer, a sensor, a user-interface device, or some other electronic device.

Although specific components are used to describe electronic device 300, in alternative embodiments, an electronic device may feature different components and/or subsystems. For example, electronic device 300 may include more than just one processing subsystem 310, memory subsystem 320, networking subsystem 330, and/or display subsystem 340. Alternatively, one or more of the subsystems may not be present in electronic device 300.

Moreover, in some embodiments, electronic device 300 may include one or more additional subsystems that are not shown in FIG. 3. By way of illustration (and not limitation), electronic device 300 could include a data collection subsystem, an audio and/or video subsystem, an alarm subsystem, a media processing subsystem, and/or an input/output (I/O) subsystem. Also, although separate subsystems are shown in FIG. 3, in some embodiments some or all of a given subsystem or component can be integrated into one or more of the other subsystems or component(s) shown in FIG. 3. For example, in some embodiments program module 322 is included in operating system 324.

Moreover, the circuits and other components of electronic device 300 may be implemented using any combination of analog and/or digital circuitry, including bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 330, such as a radio. Moreover, the integrated circuit may include hardware and/or software mechanisms that are used for transmitting wireless signals from electronic device 300 and receiving signals at the device from other electronic devices. Aside from the mechanisms herein described, radios are generally known in the art and hence are not described in detail. In general, networking subsystem 330 and/or the integrated circuit can include any number of radios. Note that the radios in multiple-radio embodiments function in a similar way to the described single-radio embodiments.

In some embodiments, networking subsystem 330 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals (e.g., determining if the received signal comprises an advertising frame).

While some of the operations described herein were implemented in hardware or software, in general the operations of the described embodiments can be implemented in a wide variety of configurations and architectures. Therefore, some or all of the operations in the preceding embodiments may be performed in hardware, in software or both.

For example, at least some of the methods and operations involved in real-time peer-to-peer communications may be implemented using program module 322, operating system 324 (e.g., a driver for interface circuit 334) and/or in firmware in interface circuit 334, especially an embodiment of interface circuit 334 configured for a Wi-Fi network. Alternatively or additionally, at least some of the operations described herein may be implemented in a physical layer, such as hardware in interface circuit 334.

In the preceding description, 'some embodiments' refers to a subset of all possible embodiments, but does not always specify the same subset of embodiments.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A device for conducting wireless data communications, the device comprising:
    a processor;
    a memory; and
    a wireless transceiver for wireless communications, wherein the processor and the wireless transceiver are configured to:
        participate in a peer-to-peer (P2P) network;
        initiate real-time data communications with a peer device in the P2P network, the peer device having a first infrastructure communication connection on a restricted communication channel, wherein the restricted communication channel requires implementation of dynamic frequency selection;
        conduct the real-time data communications while switching between the restricted communication channel and one or more channels on which the P2P network operates; and
        in response to switching to the restricted communication channel from the one or more channels on which the P2P network operates:
            calculate a period of time since a last beacon was received on the restricted communication channel; and
            resume real-time data communications in response to the calculated period of time being less than a predefined time period.

2. The device of claim 1, further comprising:
    a timer for timing a beacon interval of a central node operating on the restricted communication channel.

3. The device of claim 2, wherein:
    the first infrastructure communication connection is hosted by a first access point emitting signals with a first signal strength; and
    the processor and the wireless transceiver are further configured to:
        strategically roam from the restricted communication channel to the one or more channels on which the P2P network operates;
        wherein the strategic roaming causes the peer device to establish a second infrastructure communication connection on the one or more channels on which the P2P network operates with a second access point emitting signals with a second strength lower than the first signal strength.

4. The device of claim 1, wherein the processor and the wireless transceiver is, in response to switching to the restricted communication channel from the one or more channels on which the P2P network operates, configured to:
    remain idle until a new beacon is received on the restricted communication channel in response to the calculated period of time being greater than the predefined time period.

5. A method for conducting wireless data communications at a mobile device, the method comprising:
    joining a wireless peer-to-peer (P2P) network;

identifying a peer device in the P2P network to engage in real-time data communications;
identifying a restricted channel for the peer device to maintain a wireless communication connection with a central node;
in response to the mobile device maintaining a wireless communication connection on a channel other than the restricted channel, strategically roaming to the restricted channel; and
in response to switching to the restricted channel from the channel other than the restricted channel:
calculating a period of time since a last beacon was received on the restricted channel; and
resuming real-time data communications in response to the calculated period of time being less than a predefined time period.

6. The method of claim 5, further comprising:
implementing a sequence of channel switches to include the restricted channel and one or more channels on which the P2P network operates; and
conducting the real-time data communications while implementing the channel switching sequence of channel switches.

7. The method of claim 5, wherein the predefined time period is two beacon intervals.

8. The method of claim 5, wherein, in response to switching to the restricted channel from the channel other than the restricted channel, the method further comprises:
remaining idle until a new beacon is received on the restricted channel in response to the calculated period of time being greater than the predefined time period.

9. The method of claim 5, wherein the restricted channel has a dynamic frequency selection requirement.

10. A non-transitory computer-readable medium storing instructions that, when executed by a processor, cause the processor to perform a method for conducting wireless data communications at a mobile device, the method comprising:
joining a wireless peer-to-peer (P2P) network;
identifying a peer device in the P2P network to engage in real-time data communications;
identifying a restricted channel for the peer device to maintain a wireless communication connection with a central node;
in response to the mobile device maintaining a wireless communication connection on a channel other than the restricted channel, strategically roaming to the restricted channel, and
in response to switching to the restricted channel from the channel other than the restricted channel:
calculating a period of time since a last beacon was received on the restricted channel; and
resuming real-time data communications in response to the calculated period of time being less than a predefined time period.

11. The computer-readable storage medium of claim 10, wherein, in response to switching to the restricted channel from the channel other than the restricted channel, the method further comprises:
remaining idle until a new beacon is received on the restricted channel in response to the calculated period of time being greater than the predefined time period.

12. The computer-readable storage medium of claim 10, wherein the restricted channel has a dynamic frequency selection requirement.

13. A method for conducting wireless data communications at a mobile device, the method comprising:
joining a wireless peer-to-peer (P2P) network;
selecting a peer device in the P2P network to engage in real-time data communications;
implementing a sequence of channel switches among a restricted channel and one or more channels on which the P2P network operates; and
in response to switching to the restricted channel from the one or more channels on which the P2P network operates:
calculating a period of time since a last beacon was received on the restricted channel;
resuming real-time data communications in response to the calculated period of time being less than a predefined time period; and
strategically roaming away from the restricted channel.

14. The method of claim 13, wherein the strategic roaming comprises:
severing a first infrastructure communication connection with a first central node operating on the restricted channel and having a first signal strength; and
establishing a second infrastructure communication connection with a second central node operating on a different channel and having a second signal strength lower than the first signal strength.

15. The method of claim 13, wherein the strategic roaming comprises:
identifying a set of communication channels not used by central nodes within communication range of the mobile device; and
roaming to a channel in the set of communication channels.

16. The method of claim 15, wherein identifying a set of communication channels not used by central nodes within communication range of the mobile device comprises:
receiving, from a central node operating on the restricted channel, identities of channels used by the central nodes; and
identifying compatible communication channels other than the channels used by the central nodes.

17. The method of claim 13, wherein the strategic roaming comprises:
periodically switching to one or more channels on which the P2P network operates;
observing usage of the one or more channels; and
roaming to one of the one or more channels based at least in part on the observed usage of the one or more channels.

18. The method of claim 13, wherein upon switching to the restricted channel from the one or more channels on which the P2P network operates further comprises:
remaining idle until a new beacon is received on the restricted channel in response to the calculated period of time being greater than the predefined time period.

19. The method of claim 13, wherein the restricted channel has a dynamic frequency selection requirement.

* * * * *